US005744436A

United States Patent [19]

Flynn et al.

[11] Patent Number: 5,744,436

[45] Date of Patent: Apr. 28, 1998

[54] AZEOTROPIC COMPOSITIONS CONTAINING PERFLUORINATED CYCLOAMINOETHER

[75] Inventors: Richard M. Flynn, Mahtomedi; Daniel R. Vitcak, Oakdale, both of Minn.

[73] Assignee: Minnesota Mining and Manufacturing Company, St. Paul, Minn.

[21] Appl. No.: 586,994

[22] Filed: Jan. 16, 1996

Related U.S. Application Data

[62] Division of Ser. No. 369,505, Jan. 6, 1995, Pat. No. 5,484,489, which is a division of Ser. No. 41,693, Apr. 1, 1993, Pat. No. 5,401,429.

[51] Int. Cl.[6] .................... C11D 7/30; C11D 7/26; C11D 7/32; C09K 5/04

[52] U.S. Cl. .................... 510/178; 510/177; 510/256; 510/409; 510/411; 510/412; 510/415; 252/67

[58] Field of Search .................... 252/67; 134/42; 510/177, 178, 256, 408, 409, 411, 412, 415

[56] References Cited

U.S. PATENT DOCUMENTS

| | | | |
|---|---|---|---|
| 3,101,304 | 8/1963 | Wiist | 202/39.5 |
| 3,449,218 | 6/1969 | Jaeger | 203/44 |
| 3,904,430 | 9/1975 | Tipping et al. | 134/11 |
| 3,957,531 | 5/1976 | Tipping et al. | 134/11 |
| 4,035,250 | 7/1977 | Walters et al. | 204/59 F |
| 4,092,257 | 5/1978 | Fozzard | 252/66 |
| 4,169,807 | 10/1979 | Zuber | 252/171 |
| 4,942,179 | 7/1990 | Borgarello et al. | 514/659 |
| 4,971,716 | 11/1990 | Batt et al. | 252/171 |
| 4,994,202 | 2/1991 | Merchant | 252/172 |
| 4,996,242 | 2/1991 | Lin | 521/131 |
| 5,026,502 | 6/1991 | Logsdon et al. | 252/172 |
| 5,037,572 | 8/1991 | Merchant | 252/171 |
| 5,039,442 | 8/1991 | Swan et al. | 252/171 |
| 5,055,138 | 10/1991 | Slinn | 134/11 |
| 5,064,560 | 11/1991 | Merchant | 252/171 |
| 5,073,288 | 12/1991 | Anton | 252/162 |
| 5,073,290 | 12/1991 | Anton | 252/162 |
| 5,082,503 | 1/1992 | Sluga et al. | 134/26 |
| 5,089,152 | 2/1992 | Flynn et al. | 252/194 |
| 5,091,104 | 2/1992 | Van der Puy | 252/171 |
| 5,120,470 | 6/1992 | Ohmure et al. | 252/364 |
| 5,129,997 | 7/1992 | Shottle et al. | 203/99 |
| 5,143,652 | 9/1992 | Slinn | 252/162 X |
| 5,162,384 | 11/1992 | Owens | 521/110 |
| 5,176,757 | 1/1993 | Anton | 134/42 |
| 5,194,171 | 3/1993 | Jolley | 252/67 |
| 5,210,106 | 5/1993 | Dams et al. | 521/110 |
| 5,211,873 | 5/1993 | Dams et al. | 252/182.24 |
| 5,397,808 | 3/1995 | Doerge et al. | 521/99 |
| 5,401,429 | 3/1995 | Flynn et al. | 252/171 |
| 5,444,098 | 8/1995 | Wallaeys et al. | 521/95 |
| 5,484,489 | 1/1996 | Flynn et al. | 134/42 |
| 5,536,327 | 7/1996 | Kaiser | 134/1 |
| 5,539,008 | 7/1996 | Dams et al. | 521/131 |
| 5,607,912 | 3/1997 | Samejima et al. | 510/411 |
| 5,643,525 | 7/1997 | McGinty et al. | 264/469 |

FOREIGN PATENT DOCUMENTS

| | | |
|---|---|---|
| 0 427 604 A1 | 11/1990 | European Pat. Off. . |
| 465 037 | 1/1992 | European Pat. Off. . |
| 465037 | 1/1992 | European Pat. Off. . |
| 0 509 739 A2 | 10/1992 | European Pat. Off. . |
| 55-131096 | 10/1980 | Japan . |
| PCT/US92/07308 | 3/1993 | WIPO . |

OTHER PUBLICATIONS

Patent Abstracts of Japan, vol. 7, No. 171 (C-178) 28 Jul. 1983 & JP,A,58 079 078 (Daikin Kogyo KK) 12 May 1983.

*Primary Examiner*—Douglas J. McGinty

*Attorney, Agent, or Firm*—Gary L. Griswold; Walter N. Kirn; Eloise J. Maki

[57] ABSTRACT

An azeotropic composition includes a perfluorinated cycloaminoether and an organic solvent.

2 Claims, No Drawings

AZEOTROPIC COMPOSITIONS CONTAINING PERFLUORINATED CYCLOAMINOETHER

This is a division of application Ser. No. 08/369,505 filed Jan. 1, 1995, now U.S. Pat. No. 5,484,489, which is a division of application Ser. No. 08/041,693, filed on Apr. 1, 1993, now U.S. Pat. No. 5,401,429.

The invention relates to azeotropes.

BACKGROUND OF THE INVENTIONS

Chlorofluorocarbons (CFCs) and hydrochlorofluorocarbons (HCFCS) have been used commonly in a wide variety of solvent applications such as drying, cleaning (e.g., the removal of flux residues from printed circuit boards), and vapor degreasing. CFCs and HCFCs also commonly have been used as physical blowing agents to generate cells in foamed plastic materials. However, CFCs and HCFCs have been linked to the destruction of the earth's protective ozone layer, and replacements have been sought. The characteristics sought in replacements, in addition to low ozone depletion potential, typically have included low boiling point, low flammability, and low toxicity. Solvent replacements also should have a high solvent power.

It is known that azeotropes possess some properties that make them useful solvents. For example, azeotropes have a constant boiling point, which avoids boiling temperature drift during processing and use. In addition, when a volume of an azeotrope is used as a solvent, the properties of the solvent remain constant because the composition of the solvent does not change. Azeotropes that are used as solvents also can be recovered conveniently by distillation.

A number of azeotropic and azeotrope-like compositions that include a perfluorinated compound and an organic solvent are known in the art.

Zuber, U.S. Pat. No. 4,169,807 describes an azeotropic composition containing water, isopropanol, and either perfluoro-2-butyl-tetrahydrofuran or perfluoro-1,4-dimethylcyclohexane. The inventor states that the composition is useful as a vapor phase drying agent.

Van der Puy, U.S. Pat. No. 5,091,104 describes an "azeotropic-like" composition containing t-butyl-2,2,2-trifluoroethyl ether and perfluoromethylcyclohexane. The inventor states that the composition is useful for cleaning and degreasing applications.

Fozzard, U.S. Pat. No. 4,092,257 describes an azeotrope containing perfluoro-n-heptane and toluene.

Batt et al., U.S. Pat. No. 4,971,716 describes an "azeotrope-like" composition containing perfluorocyclobutane and ethylene oxide. The inventor states that the composition is useful as a sterilizing gas.

Shottle et al., U.S. Pat. No. 5,129,997 describes an azeotrope containing perfluorocyclobutane and chlorotetrafluorethane.

Merchant, U.S. Pat. No. 4,994,202 describes an azeotrope containing perfluoro-1,2-dimethylcyclobutane and either 1,1-dichloro-1-fluoroethane or dichloro-trifluoroethane. The inventor states that the azeotrope is useful in solvent cleaning applications and as a blowing agent. The inventor also notes that "as is recognized in the art, it is not possible to predict the formation of azeotropes. This fact obviously complicates the search for new azeotrope compositions" (col. 3, lines 9–13).

Azeotropes including perfluorohexane and hexane, perfluoropentane and pentane, and perfluoroheptane and heptane are also known.

There currently is a need for alternative azeotrope compositions that can be used in solvent and other applications. Preferably these compositions would be non-flammable, have good solvent power, and cause little if any damage to the ozone layer. Preferably, also, the azeotrope composition would consist of readily available and inexpensive solvents.

SUMMARY OF THE INVENTION

The invention features azeotropic compositions including a perfluorinated cycloaminoether and at least one organic solvent. The azeotropic compositions exhibit good solvent properties and, as a result, can replace CFCs and HCFCs in solvent applications in which low boiling CFCs and HCFCs are used. The preferred compositions are non-flammable and typically have boiling points lower than both the cycloaminoether and the organic solvent. The preferred compositions also cause little, if any, ozone depletion, and have low toxicity.

"Azeotropic composition", as used herein, is a mixture of the perfluorinated cycloaminoether and one or more organic solvents, in any quantities, that if fractionally distilled will produce a distillate fraction that is an azeotrope of the perfluorinated compound and the organic solvent(s). The characteristics of azeotropes are discussed in detail in Merchant, U.S. Pat. No. 5,064,560 (see, in particular, col. 4, lines 7–48), which is hereby incorporated by reference.

"Perfluorinated cycloaminoether", as used herein, is a perfluoro compound that includes a ring structure including a nitrogen (amine) linkage and an oxygen (ether) linkage. A perfluoro compound is one in which all of the hydrogen atom bonding sites on the carbon atoms in the molecule have been replaced by fluorine atoms, except for those sites where substitution of a fluorine atom for a hydrogen atom would change the nature of the functional group present (e.g., conversion of an aldehyde to an acid fluoride). Examples of perfluorinated cycloaminoethers are described in Owens et al. U.S. Pat. No. 5,162,384 (see in particular col. 3, line 49-col. 4, line 46), which is hereby incorporated by reference.

A HCFC is a compound consisting only of carbon, fluorine, chlorine, and hydrogen. A HFC is a compound consisting only of carbon, hydrogen, and fluorine. A hydrocarbon is a compound consisting only of carbon and hydrogen. All of these compounds can be saturated or unsaturated, branched or unbranched, and cyclic or acyclic.

The invention also features an azeotrope including a perfluorinated cycloaminoether and an organic solvent.

The azeotropic compositions are suitable for a wide variety of uses in addition to solvent applications. For example, the compositions can be used as blowing agents, as carrier solvents for lubricants, in cooling applications, for gross leak testing of electronic components, and for liquid burn-in and environmental stress testing of electronic components.

Other features and advantages of the invention will be apparent from the description of the preferred embodiment thereof, and from the claims.

DESCRIPTION OF THE PREFERRED EMBODIMENT

The more preferred perfluorinated cycloaminoethers are N-aliphatic morpholines having the following structure:

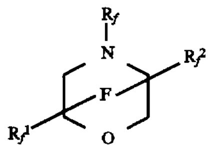

In the formula, $R_f$ is a perfluoroaliphatic group, saturated or unsaturated, having 1 to 4 carbon atoms, and $R_f^1$ and $R_f^2$ are, independently, a fluorine atom or a perfluoroaliphatic saturated or unsaturated group having 1 to 4 carbon atoms. The total number of carbon atoms in the compound preferably does not exceed 12, and more preferably it does not exceed 10. The designation "F" inside the ring is a conventional symbol that denotes that the saturated ring is fully fluorinated, that is, all ring carbon atoms are bonded to fluorine atoms, except as depicted. The compounds are commercially available or known in the literature. Examples include perfluoro-N-ethylmorpholine, perfluoro-N-methylmorpholine and perfluoro-N-isopropylmorpholine.

The preferred organic solvents include HCFCs (e.g., 1-fluoro-1,1-dichloroethane, 1,1,1-trifluoro-2,2-dichloroethane, 1,1-dichloro-2,2,3,3,3-pentafluoropropane, and 1,3-dichloro-1,1,2,2,3-pentafluoropropane), HFCs (e.g., 1,1,2,2- tetrafluorocyclobutane, 1,1,2-trifluoroethane, 1-hydro-perfluoropentane, 1-hydro-perfluorohexane, 2,3-dihydro-perfluoropentane, and 2,2,3,3-tetrahydro-perfluorobutane), chlorinated hydrocarbons (e.g, methylene chloride, 1,2-dichloroethane, and trans-1,2-dichloroethylene, hydrocarbons (e.g., cyclopentane and 2,2,4-trimethylpentane), ethers (e.g., t-butyl methyl ether, t-butyl amyl ether and tetrahydrofuran), ketones (e.g., acetone), esters (e.g., t-butyl acetate), siloxanes (e.g., hexamethyldisiloxane), and alcohols (e.g, t-butanol, methanol, ethanol, and isopropanol). The solvents can be cyclic or acyclic, branched or unbranched, and typically will have boiling points of between 20° C. and 125° C. The more carbon atoms in the solvent molecule, the higher the boiling point of the solvent. Typically, the solvent will include between 1 and 12 carbon atoms. The solvent selected preferably has a boiling point of within about 40° C. of the boiling point of the perfluorinated cycloaminoether included in the composition. Where flammability is a concern, the boiling point of the solvent more preferably is within about 25° C. to 40° C. above the boiling point of the perfluorinated cycloaminoether.

The preferred azeotropic compositions preferably include about the same quantities, by weight, of the cycloaminoether and the organic solvent(s) as the azeotrope formed between them. This in particular avoids significant boiling temperature drift and significant change in solvent power of the composition when the composition is used as a solvent. Preferably, the quantity by weight of the perfluorinated cycloaminoether and the organic solvent in the azeotropic composition is within 10%, and more preferably within 5%, of the average quantity of the cycloaminoether and the solvent found in the azeotrope formed between them. Thus, for example, if an azeotrope between a particular perfluorinated cycloaminoether and an organic solvent contains on average 60% by weight of the cycloaminoether and on average 40% by weight of the solvent, the preferred azeotropic composition includes between 54% and 66% (more preferably between 57% and 63%) of the cycloaminoether by weight, and between 36% and 44% (more preferably between 38% and 42%) of the solvent by weight. The same general guidelines apply when an azeotrope includes more than one organic solvent.

The more preferred azeotropic compositions are a single phase under ambient conditions, i.e., at room temperature and atmospheric pressure.

To determine whether a particular combination of a perfluorinated cycloaminoether and organic solvent will form an azeotrope, the particular combination can be screened by methods known in the art. For example, a composition can be carefully distilled through a four foot, perforated plate internal bellows silvered column of 45 physical plates or, alternatively, a six plate Snyder column. The initial distillate is collected, and analyzed by GLC, e.g., using a three foot Porapak P or a six foot Hayesep Q column and a thermal conductivity detector with the appropriate corrections for thermal conductivity difference between the components. In some cases a second distillation using the composition determined in the first distillation may be carried out and the composition of the distillate analyzed at intervals over the course of the distillation. If a solvent mixture is found to form a azeotrope, the composition of the azeotrope can be determined by known methods.

Examples of the azeotropes of the invention are provided in Table 1. In Table 1, component A is the perfluorinated morpholine, and components B and C are the organic solvents. The compositions are listed in weight percents. Flammability was determined either by measurement of the flash point according to ASTM test method D-3278-89, or by contact with an ignition source.

TABLE 1

| Ex. | Component A | Component B | Component C | Azeotropic Composition (A:B) | Azeotrope (A:B) | Boiling Point | Flammable | Note |
|---|---|---|---|---|---|---|---|---|
| 1 | perfluoro-N-methylmorpholine | 1,1,2,2-tetrafluoro-cyclobutane | | 50/50 | 67/33 | 39–41° C. | no | |
| 2 | perfluoro-N-methylmorpholine | 1,1,1-trifluoro-2,2-dichloroethane | | 50/50 | 14/86 | 26.5° C. | no | |
| 3 | perfluoro-N-methylmorpholine | 1-fluoro-1,1-di-chloroethane | | 50/50 | 45/55 | 27° | no | |
| 4 | perfluoro-N-methylmorpholine | 1,2-transdichloro-ethylene | | 80/20 | 68/32 | 34° C. | | two phases |
| 5 | perfluoro-N-methylmorpholine | cyclopentane | | 50/50 | 81/19 | 36° C. | yes | the boiling point of the azeotrope being measured at ambient pressure |
| 6 | perfluoro-N-methylmorpholine | t-butyl-methyl ether | | 50/50 | 81/19 | 41° C. | yes | |
| 7 | perfluoro-N-methylmorpholine | t-amyl-methyl ether | | 50/50 | 93/7 | 44° C. | no | |
| 8 | perfluoro-N-methylmorpholine | 2,2,4-trimethyl-pentane | | 50/50 | 98/2 | 51° C. | no | the boiling point of the azeotrope being measured at one atmosphere pressure |

TABLE 1-continued

| Ex. | Component A | Component B | Component C | Azeotropic Composition (A:B) | Azeotrope (A:B) | Boiling Point | Flammable | Note |
|---|---|---|---|---|---|---|---|---|
| 9 | perfluoro-N-ethylmorpholine | 1-fluoro-1,1-di-chloroethane | | 50/50 | 22/78 | 32° C. | no | |
| 10 | perfluoro-N-ethylmorpholine | 1,1,2,2-tetrafluoro-cyclobutane | | 50/50 | 42/58 | 50° C. | yes | |
| 11 | perfluoro-N-ethylmorpholine | 2,2,4-trimethyl-pentane | | 90/10 | 90/10 | 71° C. | no | the boiling point of the azeotrope being measured at one atmosphere pressure |
| 12 | perfluoro-N-methylmorpholine | t-butyl-alcohol | | 90/10 | 93/7 | 41° C. | no | two phases |
| 13 | perfluoro-N-methylmorpholine | 1,1,2,2-tetrafluoro-cyclobutane | acetone | 60/30/10 | | 37° C. | no | |
| 14 | perfluoro-N-methylmorpholine | 1,1,2,2-tetrafluoro-cyclobutane | isopropyl alcohol | 60/30/10 | 60/38/2 | 40° C. | no | |
| 15 | perfluoro-N-methylmorpholine | hexamethyl-disiloxane | | 90/10 | 96/4 | 52° C. | no | |
| 16 | perfluoro-N-methylmorpholine | t-butyl-acetate | | 93/7 | 96/4 | 52° C. | no | |
| 17 | perfluoro-N-methylmorpholine | 1,1,2,2-tetrafluoro-cyclobutane | t-butyl alcohol | 61/30/9 | 60/38/2 | 41° C. | no | |
| 18 | perfluoro-N-methylmorpholine | 2,3-dimethylpentane | t-butyl alcohol | 80/10/10 | 93/2.5/4.5 | 52° C. | no | |
| 19 | perfluoro-N-ethylmorpholine | hexamethyl-disiloxane | | 90/10 | 87/13 | 70° C. | yes | |
| 20 | perfluoro-N-methylmorpholine | t-amyl-methyl ether | t-butyl alcohol | 61/30/9 | | 51° C. | | two phases |
| 21 | perfluoro-N-methylmorpholine | 1,1,2,2,-tetrafluoro-cyclobutane | ethanol | 64/31/5 | 71/26/3 | 38° C. | No | |
| 22 | perfluoro-N-ethylmorpholine | t-butyl acetate | | 90/10 | | 69° C. | | two phases |
| 23 | perfluoro-N-methylmorpholine | cyclohexane | | 90/10 | | 48° C. | | two phases |

The azeotropic compositions of the invention can be used in a variety of applications. For example, the azeotropic compositions can be used to clean electronic articles such as printed circuit boards, magnetic media, disk drive heads and the like, and medical articles such as syringes and surgical equipment. The contaminated articles may be cleaned by contacting the article with the azeotropic composition, generally while the composition is boiling or otherwise agitated. The azeotropic compositions can be used in a variety of specific cleaning procedures, such as those described in Tipping et al., U.S. Pat. No. 3,904,430; Tipping et al., U.S. Pat. No. 3,957,531; Slinn, U.S. Pat. No. 5,055,138; Sluga et al., U.S. Pat. No. 5,082,503; Flynn et al., U.S. Pat. No. 5,089,152; and Slinn, U.S. Pat. No. 5,143,652; and Anton, U.S. Pat. No. 5,176,757, all of which are hereby incorporated by reference herein.

The cleaning ability of some preferred azeotropes were evaluated by ultrasonic washing and/or vapor degreasing coupons of various materials. Ultrasonic washing was performed in a Branson 1200 ultrasonic bath at 19.4° C. by immersing the coupon in the solvent. Vapor degreasing was performed in a Multicore soldering bath by immersing the coupon in the refluxing vapor of the solvent. The coupons were parallelepiped approximately 2.5 mm×5 mm×1.6 mm of 316 stainless steel, copper, aluminum, carbon steel, acrylic, or a printed-circuit board. Initially, coupons were cleaned with Freon 113 and then weighed to ±0.0005 g. A coupon was soiled by immersing a portion of it in the soil (Medi Kay heavy mineral oil, light machine oil, heavy machine oil, bacon grease, or Alpha 611 solder flux), removing it from the soil and weighing it. The soiled coupon was then cleaned by ultrasonic washing or vapor degreasing for 30 s and then weighed. Next, the coupon was the cleaned for an additional 30 s and then weighed. Finally, the coupon was cleaned for an additional 2 min and weighed. Weight of soil removed as a percentage of that loaded (determined by difference) is reported in Tables 2–7 for a total cleaning time of 3 min. The Freon 113 in Tables 2–6 is included for comparison. For some of the coupons the reuslts show that greater than 100% of the contaminant was removed. It is believed that this may be because the initial cleansing with Freon 113 did not remove all of the contaminant that was originally on the coupons.

TABLE 2

% MINERAL OIL REMOVED FROM COUPONS AT 3 MINUTES - ULTRASONIC WASHING

| | Carbon S | Copper | SS | Alum | PCB | Acrylic |
|---|---|---|---|---|---|---|
| Freon 113 | 100 | 100 | 100 | 100 | N/A | 100 |
| Example 11 | 100 | 100 | 100 | 100 | N/A | 100 |
| Example 18 | 105 | 100 | 100 | 100 | N/A | 100 |
| Example 7 | 100 | 111 | 100 | 100 | N/A | 100 |

TABLE 3

% BACON GREASE REMOVED FROM COUPONS AT 3 MINUTES - ULTRASONIC WASHING

| | Carbon S | Copper | SS | Alum | PCB | Acrylic |
|---|---|---|---|---|---|---|
| Freon 113 | 101 | 100 | 100 | 100 | N/A | 100 |
| Example 11 | 88 | 98 | 97 | 93 | N/A | 98 |
| Example 18 | 100 | 100 | 100 | 101 | N/A | 100 |
| Example 7 | 109 | 100 | 100 | 100 | N/A | 100 |

TABLE 4

| % LIGHT OIL REMOVED FROM COUPONS AT 3 MINUTES - ULTRASONIC WASHING | | | | | | |
|---|---|---|---|---|---|---|
| | Carbon S | Copper | SS | Alum | PCB | Acrylic |
| Freon 113 | 100 | 100 | 100 | 100 | N/A | 100 |
| Example 11 | 101 | 100 | 101 | 100 | N/A | 100 |
| Example 18 | 100 | 100 | 100 | 101 | N/A | 100 |
| Example 7 | 100 | 100 | 99 | 100 | N/A | 100 |

TABLE 5

| % HEAVY MACHINE OIL REMOVED FROM COUPONS AT 3 MINUTES - ULTRASONIC WASHING | | | | | | |
|---|---|---|---|---|---|---|
| | Carbon S | Copper | SS | Alum | PCB | Acrylic |
| Freon 113 | 100 | 100 | 100 | 100 | N/A | 100 |
| Example 11 | 100 | 100 | 99 | 100 | N/A | 100 |
| Example 18 | 100 | 100 | 100 | 100 | N/A | 100 |
| Example 7 | 100 | 100 | 100 | 100 | N/A | 100 |

TABLE 6

| CFC 113--VAPOR DEGREASING FOR 1.5 MINUTES - % OIL REMOVED | | | | | | |
|---|---|---|---|---|---|---|
| | Carbon S | Copper | SS | Alum | PCB | Acrylic |
| MINERAL OIL | 99 | 100 | 100 | 101 | 99 | 100 |
| BACON GREASE | 99 | 100 | 100 | 99 | 100 | 100 |
| MACHINE OIL | 100 | 100 | 100 | 100 | 100 | 100 |
| LIGHT OIL | 100 | 100 | 100 | 100 | 99 | 100 |

TABLE 7

| EXAMPLE 11 --VAPOR DEGREASING FOR 3.0 MINUTES - % OIL REMOVED | | | | | | |
|---|---|---|---|---|---|---|
| | Carbon S | Copper | SS | Alum | PCB | Acrylic |
| MINERAL OIL | 99 | 103 | 102 | 101 | 98 | 98 |
| BACON GREASE | 94 | 96 | 87 | 87 | 94 | 85 |
| MACHINE OIL | 97 | 99 | 99 | 98 | 95 | 96 |
| LIGHT OIL | 100 | 101 | 102 | 100 | 96 | 97 |

An azeotrope having the composition of Example 18 in Table 1 was used as the solvent in water displacement, as described in Flynn U.S. Pat. No. 5,089,152 ("Flynn"), which was previously incorporated by reference. This azeotrope was used in the procedure described in example 1 of Flynn, using 0.2% by weight of the amidol surfactant in example 2a in Table 1 of Flynn, and was found to be effective in displacing water.

Some of the azeotropic compositions of the present invention are useful for cleaning sensitive substrates such as films, including coated films and film laminates. Many such films are sensitive to organic solvents and water, which can dissolve or degrade the film, or the coating. Thus, the azeotropic compositions that are used to clean films preferably include organic solvents that do not cause degradation of the film or coating. Examples of organic solvents that are suitable for film-cleaning applications include t-amyl methyl ether, hexamethyldisiloxane, isooctane, t-butanol, and 2,3-dimethylpentane.

A sample of exposed photographic film was marked on both sides (coated and uncoated sides) with a grease pencil. The sample was then suspended in the vapor above a boiling sample of the azeotropic composition of Example 7 for a period of 30 seconds. The film was then wiped with a cotton or paper pad to remove residual amounts of the azeotrope and marking. The film sample was then visually inspected to reveal only a slight residue of the marking from the grease pencil. Both sides were cleaned equally and there appeared to be no degradation of either the film or the photographic emulsion.

This test was then repeated using another sample of exposed, marked photographic film, which was placed in the vapor above a boiling sample of the azeotropic composition of Example 18. Visual inspection of the sample revealed a slight residue. There was no apparent damage to either the film or the emulsion.

A third sample of exposed, marked photographic film was contacted with the azeotropic composition of Example 15, at room temperature. After one minute the sample was removed, wiped, and inspected. The sample revealed no traces of the grease pencil, and no apparent damage to either the film or the emulsion.

A fourth sample of exposed, marked photographic film was contacted with the liquid azeotrope of Example 18 at room temperature. After four minutes, the sample was removed, wiped, and inspected. The cleansed sample revealed no traces of the grease pencil.

A fifth sample of exposed photographic film was marked on both sides and contacted with the liquid azeotrope of Example 18 at 36° C., with ultrasonic agitation. After three minutes, the sample was removed, wiped, and inspected. The cleansed sample revealed no traces of the grease pencil.

The azeotropic compositions also can be used as blowing agents, according to the procedures described Owens et al., U.S. Pat. No. 5,162,384, which was previously incorporated by reference herein.

Other embodiments are within the claims.

What is claimed is:

1. An azeotropic composition consisting essentially of about 50 to 40 weight percent perfluoro-N-methylmorpholine and about 50 to 60 weight percent 1-fluoro-1,1-dichloroethane, which when fractionally distilled, produces a distillate fraction that is an azeotrope of perfluoro-N-methyl-morpholine and 1-fluoro-1,1-dichloroethane that boils at about 27° C. at atmospheric pressure.

2. The azeotropic composition of claim 1 wherein the composition consists essentially of about 45 weight percent perfluoro-N-methyl-morpholine and about 55 weight percent 1-fluoro1,1-dichloroethane and is an azeotrope that boils at about 27° C. at atmospheric pressure.

* * * * *